United States Patent [19]
Liu et al.

[11] Patent Number: 5,257,389
[45] Date of Patent: Oct. 26, 1993

[54] IMER-PRODUCT ARRAY PROCESSOR FOR RETRIEVAL OF STORED IMAGES REPRESENTED BY BIPOLAR BINARY (+1,−1) PIXELS USING PARTIAL INPUT TRINARY PIXELS REPRESENTED BY (+1,−1)

[75] Inventors: Hua-Kuang Liu, Pasadena, Calif.; Abdul A. S. Awwal, Kettering; Mohammad A. Karim, Centerville, both of Ohio

[73] Assignee: California Institute of Technology, Pasadena, Calif.

[21] Appl. No.: 515,247

[22] Filed: Apr. 27, 1990

[51] Int. Cl.$^5$ .................. G06F 15/62; G11C 15/00
[52] U.S. Cl. ................................ 395/800; 395/21; 395/27; 395/118; 364/274.9
[58] Field of Search ............ 395/21, 27, 800, 118

[56] References Cited

U.S. PATENT DOCUMENTS

| | | | |
|---|---|---|---|
| 4,633,389 | 12/1986 | Tanaka et al. | 395/800 |
| 4,807,168 | 2/1989 | Moopenn et al. | 364/602 |
| 5,023,833 | 6/1991 | Baum et al. | 395/49 |
| 5,095,459 | 3/1992 | Ohta et al. | 395/25 |

OTHER PUBLICATIONS

J. J. Hopfield, "Neural networks and physical systems with emergent collective computational abilities," Proc. Natl. Acad. Sci. USA vol. 79, pp. 2554–2558 (1982).

N. H. Farhat, D. Psaltis, A. Prata and E. Paek, "Optimal implementation of the Hopfield model," Appl. Opt. vol. 24, No. 10, pp. 1469–1475 (1985).

J. S. Bayley and M. A. Fiddy, "On the use of the Hopfield model for optical pattern recognition," Opt. Commun. vol. 64, No. 2, pp. 105–110 (1987).

B. Macukow and H. H. Arsenault, "Modification of threshold condition for a content-addressable memory based on the Hopfield model," Appl. Opt. vol. 26, No. 1, pp. 34–36 (1987).

M. Takeda and J. W. Goodman, "Neural networks for computation number representations and programming complexity," Appl. Opt. vol. 25, No. 18, pp. 3033–3046 (1986).

S. Y. Kung and H. K. Liu, "An optical inner-product array processor for associative retrieval," Proc. SPIE, vol. 613, Nonlinear Optics and Applications, pp. 214–219 (1986).

A. A. S. Awwal, M. A. Karim and H. K. Liu, "Associative memory: an optimum binary neuron representation," Proc. SPIE, vol. 1053, Optical Pattern Recognition, pp. 17–29 (1989).

K. F. Cheung, L. E. Atlas and R. J. M-rks II, "Synchronous vs asynchronous behavior of Hopfield's CAM neural net," Appl. Opt. vol. 26, No. 22, pp. 4808–4813 (1987).

G. F. Gindi, A. F. Gmitro and K. Parthasarathy, "Hopfield model associative memory with nonzero-diagonal terms in memory matrix," Appl. Opt. vol. 27, No. 1, pp. 129–134 (1988).

(List continued on next page.)

*Primary Examiner*—Parshotam S. Lall
*Assistant Examiner*—Krisna Lim
*Attorney, Agent, or Firm*—Antonio M. Fernandez

[57] ABSTRACT

An inner-product array processor is provided with thresholding of the inner product during each iteration to make more significant the inner product employed in estimating a vector to be used as the input vector for the next iteration. While stored vectors and estimated vectors are represented in bipolar binary (1,−1), only those elements of an initial partial input vector that are believed to be common with those of a stored vector are represented in bipolar binary; the remaining elements of a partial input vector are set to 0. This mode of representation, in which the known elements of a partial input vector are in bipolar binary form and the remaining elements are set equal to 0, is referred to as trinary representation. The initial inner products corresponding to the partial input vector will then be equal to the number of known elements. Inner-product thresholding is applied to accelerate convergence and to avoid convergence to a negative input product.

11 Claims, 7 Drawing Sheets

OTHER PUBLICATIONS

R. J. Marks II, L. E. Atlas, J. J. Choi, S. Oh, K. F. Cheung and D. C. Park, "Performance analysis of associative memories with nonlinearities in the correlation domain," Appl. Opt. vol. 27, No. 14, pp. 2900–2904, (1988).

R. A. Athale, H. H. Szu and C. B. Friedlander, "Optical implementaton of associative memory with controlled nonlinearity in the correlaton domain," Opt. Lett. vol. 11, No. 7, pp. 482–484 (1986).

B. L. Montgomery and B. V. K. Vijaya Kumar, "Evaluation of the use of the Hopfield neural network model as a nearest-neighbor algorithm," Appl. Opt. vol. 25, No. 20, pp. 3759–3766 (1986).

H. K. Liu, T. H. Chao, J. Barhen and G. Bittner, "Inner-product optical neural processing and supervised learning," Abstracts of the 1st Int. Neural Network Society Meeting, vol. 1, p. 391 (Sep. 1988).

M. A. Karim, A. A. S. Awwal and A. K. Cherri, "Polarization encoded optical shadow-casting logic units: design," Appl. Opt. vol. 26, No. 14, pp. 2720–2725 (1987).

A. A. S. Awwal and M. A. Karim, "Associative polarization-encoded optical shadow casting: gray-level image encoding for serial and parallel operations," Appl. Opt. vol. 28, No. 2, pp. 284–290 (1989).

A. A. S. Awwal, M. A. Karim and A. K. Cherri, "Polarization-encoded optical shadow-casting scheme: design of multioutput trinary combinational logic units," Appl. Opt. vol. 26, No. 22, pp. 4814–4818 (1987).

H. K. Liu, J. A. Davis and R. A. Lilly, "Optical-data-processing properties of a liquid-crystal television spatial light modulator," Opt. Lett. vol. 10, No. 12, pp. 635–637 (1985).

H. K. Liu, S. Y. Kung and J. A. Davis, "Real-time optical associative retrieval technique," Opt. Eng. vol. 25, No. 7, pp. 853–856 (1986).

FIG. 1

| Type | Vector Elements | | | Inner Products | |
|---|---|---|---|---|---|
| | Stored | Input | Weight | Exact | Unexpected |
| I unipolar-unipolar | 0<br>0 | 0<br>1 | 0<br>0 | | |
| | 1<br>1 | 0<br>1 | 0<br>1 | S | (n-H)/2 |
| II bipolar-unipolar | -1(0)<br>-1(0) | 0<br>1 | 0<br>-1 | | |
| | 1(1)<br>1(1) | 0<br>1 | 0<br>1 | S-d | (n/2)-H |
| III bipolar-bipolar | -1(0)<br>-1(0) | -1(0)<br>1(1) | 1<br>-1 | | |
| | 1(1)<br>1(1) | -1(0)<br>1(1) | -1<br>1 | n-2H | n-2H |
| IV unipolar-bipolar | 0<br>0 | -1(0)<br>1(1) | 0<br>0 | | |
| | 1<br>1 | -1(0)<br>1(1) | -1<br>1 | S - S' | (n/2) - H |

FIG. 2a

| Input Vector | Hamming Distance | Starting Weight With Input | | Converges When | | | |
|---|---|---|---|---|---|---|---|
| | | bipolar | unipolar | stored: bipolar input: bipolar | | stored: bipolar input: unipolar | |
| | | | | and when IP threshold is | | and when IP threshold is | |
| | | | | absent | present | absent | present |
| a1(1:7) | (7,12,13,8) | (6,-4,-6,4) | (5,-3,-1,3) | a1(3) | a1(2) | FC | a1(2) |
| a2(1:7) | (13,6,13,10) | (-6,8,-6,0) | (-1,3,-1,1) | a2(3) | a2(2) | a2(2) | a2(2) |
| a3(1:7) | (11,10,9,10) | (-2,0,2,0) | (1,-1,3,1) | a3(3) | a3(2) | FC | a3(2) |
| a4(1:7) | (9,10,13,6) | (2,0,-6,8) | (3,-1,-1,5) | a4(3) | a4(2) | a4(2) | a4(2) |
| a1(1:4) | (9,10,13,10) | (2,0,-6,0) | (3,-1,-1,1) | -a3(2) | a1(2) | a1(2) | a1(2) |
| a2(1:4) | (12,7,12,9) | (-4,6,-4,2) | (0,2,0,2) | a2(3) | a2(2) | a4(3) | FC |
| a3(1:4) | (12,9,10,11) | (-4,2,0,-2) | (0,0,2,0) | FC | a2(2) | a3(2) | a3(2) |
| a4(1:4) | (11,8,13,8) | (-2,4,-6,4) | (1,1,-1,3) | FC | a2(2) | a4(3) | a4(2) |
| a1(16:20) | (10,9,12,11) | (0,2,-4,-2) | (2,0,0,0) | -a3(3) | a2(2) | a1(2) | a1(2) |
| a2(16:20) | (12,7,14,11) | (-4,6,-8,-2) | (0,2,-2,0) | a2(3) | a2(2) | FC | a2(2) |
| a3(16:20) | (13,12,9,10) | (-6,-4,2,0) | (-1,-3,3,1) | a3(3) | a3(2) | FC | a3(2) |
| a4(16:20) | (13,10,11,8) | (-6,0,-2,4) | (-1,-1,1,3) | FC | a4(2) | a4(3) | a4(2) |
| a1(13:20) | (9,8,13,12) | (2,4,-6,-4) | (3,1,-1,-1) | -a3(4) | a2(2) | a1(3) | a1(2) |
| a2(13:20) | (13,4,13,12) | (-6,12,-6,-4) | (-1,5,-1,-1) | a2(2) | a2(2) | a4(2) | a2(2) |
| a3(13:20) | (15,10,7,10) | (-10,0,6,0) | (-3,-1,5,1) | -a1(2) | a3(2) | a3(2) | a3(2) |
| a4(13:20) | (14,9,10,7) | (-8,2,0,6) | (-2,0,2,4) | -a1(3) | a4(2) | a4(3) | a4(2) |
| a1(1,2,18:20) | (10,9,12,13) | (0,2,-4,-6) | (2,0,0,-2) | -a4(2) | a2(2) | a1(3) | a1(2) |
| a2(1,2,18:20) | (13,6,13,10) | (-6,8,-6,0) | (-1,3,-1,1) | a2(3) | a2(2) | a2(2) | a2(2) |
| a3(1,2,18:20) | (13,10,9,10) | (-6,0,2,0) | (-1,-1,3,1) | -a1(2) | a3(2) | a3(2) | a3(2) |
| a4(1,2,18:20) | (15,8,11,8) | (-10,4,-2,4) | (-3,1,1,3) | -a1(3) | a2(3) | FC | a4(2) |

FIG. 2b
INPUT VECTORS RANDOM

| Hamming Distance | Starting Weight With Input | | Converges When | | | |
|---|---|---|---|---|---|---|
| | | | stored: bipolar input: bipolar | | stored: bipolar input: unipolar | |
| | | | and when IP threshold is | | and when IP threshold is | |
| | bipolar | unipolar | absent | present | absent | present |
| (9,12,13,10) | (2,-4,-6,0) | (3,-3,-1,1) | a1(3) | a1(2) | FC | a1(2) |
| (9,10,13,10) | (2,0,-6,0) | (3,-1,-1,1) | a3(3) | a1(2) | a1(2) | a1(2) |
| (9,8,15,10) | (2,4,-10,0) | (3,1,-3,1) | -a3(3) | a2(2) | a1(2) | a1(2) |
| (8,9,14,11) | (4,2,-8,-2) | (4,0,-2,0) | -a3(3) | a1(2) | a1(2) | a1(2) |
| (8,11,14,9) | (4,-2,-8,2) | (4,-2,-2,2) | -a3(3) | a1(2) | a1(3) | a1(2) |
| (11,8,13,12) | (-2,4,-6,-4) | (1,1,-1,-1) | a2(3) | a2(2) | a1(4) | FC |
| (12,9,12,11) | (-4,2,-4,-2) | (0,0,0,0) | a2(3) | a2(2) | FC | FC |
| (11,10,11,12) | (-2,0,-2,-4) | (1,-1,1,-1) | -a4(3) | FC | FC | FC |
| (10,7,14,11) | (0,6,-8,-2) | (2,2,-2,0) | -a3(3) | a2(2) | FC | FC |
| (9,8,15,10) | (2,4,-10,0) | (3,1,-3,1) | -a3(3) | a2(2) | a1(5) | a1(2) |
| (11,8,13,8) | (-2,4,-6,4) | (1,1,-1,3) | FC | a4(3) | a4(3) | a4(2) |
| (9,10,13,6) | (2,0,-6,8) | (3,-1,-1,5) | a4(3) | a4(2) | a4(2) | a4(2) |

FIG. 3

| Input Vector | Hamming Distance | Starting Weight With Input | | Converges When | | | |
|---|---|---|---|---|---|---|---|
| | | bipolar | unipolar | stored: bipolar input: bipolar | | stored: bipolar input: unipolar | |
| | | | | and when IP threshold is | | and when IP threshold is | |
| | | | | absent | present | absent | present |
| a3(1:4) | (3,2,0,3) | (-2,0,4,-2) | (0,0,2,0) | a3(3) | a3(3) | a3(3) | a3(3) |
| a4(1:4) | (2,1,3,0) | (0,2,-2,4) | (1,1,-1,3) | a4(3) | a4(3) | a4(3) | a4(2) |
| a1(16:20) | (0,2,3,3) | (5,1,-1,-1) | (2,0,0,0) | a1(2) | a1(2) | a1(2) | a1(2) |
| a1(13:20) | (0,4,5,6) | (8,0,-4,-2) | (3,1,-1,-1) | a1(2) | a1(2) | a1(3) | a1(2) |
| a1(1,2,18:20) | (0,3,3,3) | (5,-1,-1,-5) | (2,0,0,-2) | a1(3) | a1(3) | a1(3) | a1(2) |
| a4(1,2,18:20) | (5,2,2,0) | (-5,1,1,5) | (-3,1,1,3) | -a1(3) | a2(2) | a4(3) | FC |

S2　S1　S2　S3　S4

S1　S2　S3　S4

IMER-PRODUCT ARRAY PROCESSOR FOR RETRIEVAL OF STORED IMAGES REPRESENTED BY BIPOLAR BINARY (+1,−1) PIXELS USING PARTIAL INPUT TRINARY PIXELS REPRESENTED BY (+1,−1)

ORIGIN OF THE INVENTION

The invention described herein was made in the performance of work under a NASA contract, and is subject to the provisions of Public Law 96-517 (35 USC 202) in which the Contractor has elected to retain title.

TECHNICAL FIELD

This invention relates to associative recall of one or two dimensional vectors, sometimes more appropriately referred to herein as "images" or "image vectors", from associative memory, and more particularly to an inner-product trinary associative memory in which image elements are stored in bipolar binary representation (1,−1), and a partially known input image is in trinary neuron representation (1,0,−1) in which known pixel elements are represented by bipolar binary values of 1 and −1, and unknown elements are represented by 0's.

BACKGROUND ART

In many industrial and optical computing applications, it is necessary to reconstruct an object's complete description from a partial description. Systems for performing such image reconstruction are expected to have an a priori knowledge of the object image to be reconstructed. To fully utilize parallelism of optics, the memory elements should be such that they can be accessed simultaneously and in parallel on the basis of data content rather than by specific address or location. Such a memory, referred to as an associative memory, delivers, the output even when it is stimulated by a partial image input of the stored information. The mechanics of storing, matching, and decision making determines the actual performance of the associative memory.

Hopfield has described a memory matrix that is easy to implement and requires very little time for learning and retrieval. J. J. Hopfield, "Neural networks and physical systems with emergent collective computational abilities," Proc. Natl. Acad. Sci. USA 79, 2554–2558 (1982). The prior art reveals several implementations of this model in which only bipolar binary numbers (1,−1) were used for storing vectors and unipolar binary numbers (1,0) were used to address the memory. N. H. Farhat, D. Psaltis, A. Prata and E. Paek, "Optical implementation of the Hopfield model," Appl. Opt. 24(10), 1469–1475 (1985) and B. Macukow and H. H. Arsenault, "Modification of the threshold condition for a content-addressable memory based on the Hopfield model," Appl. Opt. 26(1), 34–36 (1986). Several different modifications to this initial work of Hopfield have already been proposed, and there have been several reported studies on various number representations of neurons. J. S. Bayley and M. A. Fiddy, "On the use of the Hopfield model for optical pattern recognition," Opt. Commun. 64, 105–110 (1987) and M. Takeda and J. W. Goodman, "Neural networks for computation: number representations and programming complexity," Appl. Opt. 25(18), 3303–3046 (1986).

The Hopfield model uses the outer product of a vector with itself as a memory matrix for that vector and thereafter adds such memory matrices of each of the nearly orthogonal stored vectors. An inner-product associative memory has been proposed based on Hopfield's model (with autoneural interconnect). S. Y. Kung and H. K. Liu, "An optical inner-product array processor for associative retrieval," Proc. SPIE, Vol. 613, Nonliner Optics and Applications, 214–219 (1986). For matching and retrieval, the memory is addressed by an input vector $V^{in}$. Accordingly, the ith element of the estimated vector $V^{es}$ is given by $$V^{es}_i = sgn\left[\sum_{k=1}^{M} V^{st,k}_i \left(\sum_{j=1}^{n} V^{st,k}_j V^{in}_j\right)\right], \quad (1)$$

where $V_p^{st,m}$ represents the pth element of the mth stored vector and n is the length of the vectors.

The convergence mechanism of vectors in Hopfield's neural network in relation to recognition of partially known patterns has been studied in terms of both inner products and Hamming distance, the measure of similarity between objects. In much of the prior art, the Hamming distance has been used as a measure of dissimilarity, overlooking the role of the inner products in determining convergence. In cases other than that of the bipolar binary input, the Hamming distance criterion does not directly represent the ongoing matching process of convergence. Inner-product weighting coefficients play a more dominant role in many data representations for determining the convergence mechanism.

Each of the input representations, bipolar binary and unipolar binary, has its own merit. With bipolar binary input and thresholding, the convergence outcome of the associative memory always agrees with the minimum Hamming distance criterion. At the same time, the bipolar binary representation prevents the input from converging to a negative vector. On the other hand, the use of binary unipolar representation seems to recognize a partial input vector irrespective of its Hamming distance.

Recently it has been shown that in cases other than that of the bipolar binary input, the Hamming distance criterion does not directly represent the ongoing matching process of convergence. A. A. S. Awwal, M. A. Karim and H. K. Liu, "Associative memory: an optimum binary neuron representation," Proc. SPIE, Vol. 1053, Optical Pattern Recognition, 17–29, (1989). An object of this invention is to provide associative memory using trinary neuron representation which overcomes these discrepancies. The resulting trinary associative memory may be used to process one dimensional as well as two-dimensional stored images, such as those encountered in industrial applications.

STATEMENT OF THE INVENTION

To combine the merits of both unipolar and bipolar neuron representations, an inner-product array processor for associative retrieval of a best-match image with a partial image has been developed to make title initial inner product more significant. To do that, the stored images are represented by bipolar binary values of 1 and −1, and only the elements of a partial image description , i.e., image pixels that are known (i.e., believed to be common with those of a stored image) are represented by bipolar binary values 1 and −1, and the remaining elements are set to 0. This mode of representation of a partial image description is referred to herein as trinary neuron representation, namely representation by 1 or −1 for known pixel elements and 0 for all other elements not known. An inner product is formed for each trial comparison with stored images in an iterative search process for the closest estimated image. The initial inner products correspond to the known elements of the partial image description. After thresholding each of the inner products of each iteration, an estimated image is formed which is a linear combination of the bipolar binary stored image weighted by the thresholded inner products. Each of the estimated images is fed back as the input partial image description for the next iteration. In that manner, the maximum inner products of each successive iteration are used as weights which generate an input vector for the next iteration. The process is repeated until convergence is reached.

BRIEF DESCRIPTION OF THE DRAWINGS

FIG. 1 is a table which shows the combinations of the input and stored vectors that may appear in an inner product.

FIG. 2a is a table of simulation results for input vectors whose M through n elements are identical to those of the stored vector ai while the remaining elements are zero for the particular stored vectors ai, where i=1,2,3 and 4.

FIG. 2b is a table of simulation results for random input vectors.

FIG. 3 is a table of simulation results for convergence of particular input vectors with starting weights calculated for both trinary representation and unipolar representation.

DETAILED DESCRIPTION OF THE INVENTION

Analysis

Figure 4:
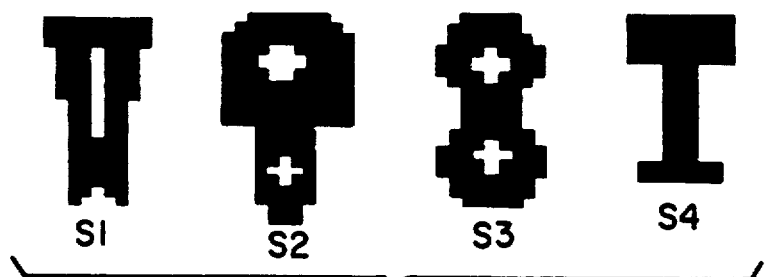
FIG. 4 illustrates two-dimensional images of four machine parts having reasonably similar Hamming distances.

The inner-product operation of the partial image input vector $V^{in}$ with stored image vectors is equivalent to matching the input vector with all of the stored vectors. The "sgn" (i.e., hard limiter) operation in Equation (1) is basically a threshold operation that removes noise and clutter and retrieves the closest estimated vector. The estimated vector is then fed back as the new input vector. After repeated iterations, the estimated image vector is expected to converge to the one stored image vector to which the initial input image is the closest.

The estimated image vector can be expressed as a sum of weighted stored vectors, where the weights correspond to the inner products. Let $a_i$ represent the inner product of the ith stored image vector with the input image. Then the estimated image vector can be rewritten as $$V^{es} = sgn\left(\sum_{i=1}^{M} a_i V^{st,k}\right) \qquad (2)$$

$$= sgn\left(a_k V^{st,k} + \sum_{i \neq k}^{M} a_i V^{st,i}\right)$$

where $a_k > a_i$ (when $i=1,\ldots,n$ and $i \neq k$) represents the largest inner product. One may safely assume that when the stored vectors are nearly orthogonal, the inner product between the input and one of the stored vectors will become maximum while those of the remaining stored vectors will be less than the maximum. The condition of orthogonality assures that as the iterated input vector moves closer to one of the stored vectors, it tends to move away from the remaining stored vectors.

One very obvious method of retrieving the desired stored image vector is to choose by electronics and software the stored vector corresponding to $a_k$. This approach is the same as correlating the input vector with all of the stored vectors by forming inner products and then choosing the one having the highest correlation. When the input image length of the vector is large compared with the number of stored images vectors, as is easily the case for a two-dimensional input image represented by N rows or rasters of M pixel elements per row which is thus represented by a vector having NM pixel elements, $a_k$ becomes significantly large compared with the $a_i$ (i.e., the remaining inner product), resulting in a correct convergence.

Neuron Representation and Decision Making

The elements of each vector can be either unipolar binary (consisting of 1 and 0) or bipolar binary (consisting of 1 and $-1$). A table set forth in FIG. 1 shows the combinations of the input and stored vector elements that may appear in the inner product for each of four cases. The vector element values within parenthesis are the actual values; the values outside parenthesis correspond to the bipolar value. Each of these four cases generates a particular type of inner product. This amounts to four different kinds of associative to representations of the inner product model since only it can provide insights into the convergence and retrieval processes. It may be noted that the nonzero autoconnect (diagonal) case generally has a better convergence rate. K. F. Cheung, L. E. Atlas and R. J. Marks II, "Synchronous vs asynchronous behavior of Hopfield's CAM neural net," Appl. Opt. 26(22), 4808–4813 (1987); G. R. Gindi, A. F. Gmitro and K. Parthasarathy, "Hopfield model associative memory with non-zero-diagonal terms in memory matrix," Appl. Opt. 27, 129–134 (1988).

When both the stored and input vectors are represented in unipolar binary, the resultant inner product S is equal to the number of 1's that are present at identical positions of the two vectors. Note that the Hamming distance H is given by [n−(number of matching 1's + number of matching 0's)], where n is the number of vector elements. The degree of similarity thus ranges from a minimum of 0 through a maximum of (n−H), with the expected value of the inner product being in the neighborhood of (n−H)/2. When the stored vector is bipolar, and the input vector is unipolar, the exact inner product is given by (S−d), where d represents the number of elements equal to 1 in the input vector and the number of elements equal to −1 (representing 0) in the corresponding location of the stored vector. If 50% of (n−H) vector element combinations corresponds to matching 1's and if 50% of H relates to the appearance of a 1 in the input vector while the corresponding stored value is −1, then the expected inner product is given by $\{[(n-H)/2]-(H/2)\}=[n/2]-H]$.

The number of matching 1's was proposed as a degree of similarity for measuring the closeness of vectors. In general, the exact inner product is related to the Hamming distance, but the number of 1's in both stored and input vectors can heavily bias the inner products. This is why the input vector sometimes converges to a stored vector having a higher Hamming distance instead of converging to one having a smaller Hamming distance. Interestingly, the majority of the simulation models developed in the past have used Hamming distance as a measure of dissimilarity and thus have failed to recognize the fact that the inner product plays a more important role in determining convergence.

Hamming distance, however, can be incorporated in the model to directly affect the inner product of the vectors in an exact sense rather than in a probabilistic sense, only when the input vector representation is bipolar binary, as shown in FIG. 1 for case III. This is because the matching 1's as well as the matching 0's contribute toward increasing the inner product. Thus, when both the input and stored vectors are bipolar binary, the exact inner product on each vector is (n−2H).

Consider next the case in which the stored vector is unipolar binary, while the input vector is bipolar binary, case IV in FIG. 1. Defining S' as the number of locations having a −1 at the input vector and a 1 at the corresponding location of the stored vector, the inner product is (S−S'), where S is the number of 1's present at identical positions of the stored and input vectors. If 50% of H relates to the appearance of a −1 (representing 0) at the input while the corresponding stored value is 1 and 50% of (n−H) is matching 1's, then the inner product is [(n/2)−H].

For example, consider that only a portion of the stored vector is available as a partial input, in which case both matching 1's and matching 0's should be allowed to contribute to the inner product since 0's also carry information just as do 1's. In such a scenario, it may be desirable to represent both input and stored vectors in bipolar binary form, as in case III. Now consider the case of a complete portrait of the stored vectors with one or more false 1's in the input vector. It may then be desirable not to decrease the inner product owing to the presence of a false 1, but the presence of a false 0 in the input should reduce the inner product. Case IV of FIG. 1 achieves this particular objective.

For measuring the degree of similarity, Hamming distance H can be used in only case III (bipolar-bipolar), while in all other cases the inner products directly represent the degree of similarity. The Hamming distance works statistically but not exactly (since the matching 0's do not contribute to the inner product) for the other case, as will be shown by the simulation results. When the input is random, the associative memory acts as a pattern classifier, wherein the search is for the stored vector that is its nearest neighbor. In this case, the Hamming distance serves well as a measure of closeness of the vector. Therefore, bipolar-bipolar representation is generally considered suitable for pattern classification. However, when there is a large Hamming distance between the input and one of the stored vectors (i.e., when 2H>n), the inner product may become negative. In the extreme case, a negative inner product may even lead to a convergence to a vector that is the complement of the stored vector having the largest Hamming distance.

The iterative method of searching in all cases begins to pose a problem when the inner products of the input vector with all stored vectors are so relatively close that no single inner product surpasses the others sufficiently to be recognized. The most disappointing problem, however, in the case of the unipolar binary input vector is that very often the highest inner product may not correspond to the lowest Hamming distance. Also, unipolar binary inputs (having large Hamming distances) may result in complementary convergences. Although false convergences involving only unipolar binary inputs have been recognized as problems in earlier works, the actual problem has not been either diagnosed or cured. Specific examples of vector convergences to the complement of a stored vector are identified and discussed below.

Inner-Product (IP) Thresholding

As noted above, one would like to use a variable threshold in the inner product domain, such as average-inner-product thresholding, in order to choose the maximum of the inner product. For Hamming distances $H_1$ $H_2$, ... and $H_n$, of the input vector from n stored vectors, the inner products are respectively $(n-2H_1)$, ... $(n-2H_n)$. When $H_i>n/2$, the inner product becomes negative. With slight modification, for practical reasons, one could use zero-crossing thresholding in the inner product domain, which is reasonably easy to implement in hardware. If, for example, an input vector is more than n/2 Hamming distance away from any one of the stored vectors, then by scalar thresholding in the inner product domain one could prevent its convergence to the complement of the stored vector. From another point of view, zero-crossing thresholding is analogous to forgetting the vector(s) of very high Hamming distance, thus increasing the chance of correct convergence to the true stored vector on the theory that only the complement of a stored vector has any probability of having a large Hamming distance. This mimics a function in which an input stimulus does not compete with all of the stored information for locating its closest neighbor but competes only with a particular class of information, totally disregarding the rest of the classes. Consequently, the ith element of the estimated vector $V^{es}$ can be modified to $$\left[ V_i^{es} = sgn \sum_{k=1}^{M} V_k^{st,k} sgn \left( \sum_{j=1}^{n} V_j^{st,k} V_j^{in} \right) \right] \quad (3)$$

This is equivalent to introducing a nonlinear operation in the correlation domain. R. J. Marks II, L. E. Atlas, J. J. Choi, S. Oh, K. F. Cheung and D. C. Park, "Performance analysis of associative memories with nonlinearities in the correlation domain," Appl. Opt. 27(14), 2900–2904 (1988); R. A. Athale, H. H. Szu and C. B. Friedlander, "Optical implementation of associative memory with controlled nonlinearity in the correlation domain," Opt. Lett. 11, 482–484 (1986).

Problem Diagnosis Using Simulation

In the simulation to be described with reference to tables in FIG. 2a and FIG. 2b, various types of input vectors (both random and nonrandom) were chosen. The four vectors that were chosen are as follows:

$$a1 = (1 \ -111 \ -1111 \ -1111 \ -11 \ -1 \ -11 \ -1 \ -11) \quad (4)$$

$$a2 = (-11 \ -111 \ -1 \ -11 \ -1 \ -1 \ -1 \ -111 \ -1 \ -1 \ -111)$$

$$a3 = (11 \ -1 \ -1 \ -11 \ -1111 \ -111 \ -11111 \ -1 \ -1)$$

$$a4 = (-1111 \ -111 \ -11 \ -11 \ -1 \ -1 \ -11 \ -1111 \ -1)$$

When an input vector is applied to the memory, it is actually related to all of the stored vectors rather than to just one stored vector. For example, an input vector that is at a Hamming distance x from the stored vector p may actually be closer to another stored vector q (at a Hamming distance of y) when x>y. Consequently, the process of accounting with only one Hamming distance is not sufficient. Therefore, the input vectors are identified by a set of four Hamming distances for the case under consideration of four vectors a1 through a4.

For simplicity, ai(m:n) in the table of FIG. 2a denotes a vector whose m through n elements are identical to those of the stored vector ai while the remaining elements are zeroes. For comparison, a table set forth in FIG. 2b includes simulation results pertaining to several random inputs. For each of the input vectors in both FIG. 2a and FIG. 2b, the corresponding Hamming distances and the inner products obtained immediately after the first iteration for both bipolar and unipolar representations are listed respectively under the second and third column headings.

The entries in the remaining columns indicate to which stored vector the input vector converges, and how many iterations were required for convergence. FC entries indicate false convergences. In each column, the entry ai(j) indicates that the input vector converges to the stored vector ai after j iterations. Consider the first input vector a1(1:7) in FIG. 2a and the bipolar-bipolar format for the stored and input vectors. From the Hamming coordinate one can conclude that it is closest to a1, and after three iterations when IP threshold is absent, it actually converges to a1. The actual stable vector in this case prior to thresholding is 20a1−−6a2−4a3 −2a4 (not entered in the table) . When IP thresholding is present in accordance with the invention, the vectors a2 and a3 are eliminated from the retrieval process after the first iteration, and convergence is reached in two iterations, thus leading to a faster convergence with no ambiguity. With bipolar binary and unipolar binary representations, respectively, for the same stored and input vectors (first row of FIG. 2a), no convergence is achieved; instead, the output stabilizes to a false vector 6a1−10a2+6a3+2a4 (denoted in the table by FC). The initial inner products are (5, −3, −1, 3), but since 5 is less than the absolute sum of the other three inner products, these inner products drive a1(1:7) toward a false vector. Obviously, IP thresholding would have favored a1 since a2 and a3 would have been out of consideration, and clearly 5a1+3a4 would have converged to a1, thus demonstrating another feature of the invention, namely inner-product (IP) thresholding. Sometimes large negative inner products drive the vector to the complement of the vector (such as the stored vector a3 for the input vector a1(1:4)). Such problems can be avoided by IP thresholding.

Evaluation of Simulation Results

By studing the findings of the tables in FIGS. 2a and 2b, one can make the following observations involving the convergence of the input vector to one of the stored vectors.

First, the simulations support the assumption that in the case of unipolar binary representation for the input, the Hamming distance criterion does not determine the vector convergence since the input vector usually converges to a stored vector that corresponds to the highest inner product. For example, the input vector a2(1:4) in the sixth row of FIG. 2a, when represented in unipolar binary form, incorrectly converges after three iterations to the stored vector a4 even though the Hamming distance criterion suggests that it should instead converge to a2. Such nonconvergence of input vectors to nonmininum Hamming distance vectors was also observed in an earlier work. B. L. Montgomery and B. V. K. Vijaya Kumar, "Evaluation of the use of the Hopfield neural network model as a nearest-neighbor algorithm," Appl. Opt. 25, 3759–3766 (1986).

Second, the input vectors using bipolar binary representation usually converge to a stored vector for which the inner product is the largest in magnitude. Whenever the largest inner product is negative, the convergence incorrectly leads to a vector that is the complement of the stored vector for which the negative inner product is maximum in the absence of thresholding. For example, in the absence of IP thresholding, the input vector a1(1:4) in the fifth row, which is a derivative of a1, incorrectly converges to −a3 instead of converging to a1 (as Hamming distance criterion would suggest). Clearly, this anomaly can be predicted by observing the inner product value −6 for the vector a3, while the inner product value corresponding to the vector a1 is only 2. Other simulations have also shown that when the input and stored vectors are both represented by bipolar binary numbers, convergence to complement vectors always occurs. H. K. Liu, T. H. Chao, J. Barhen and G. Bittner, "Inner-product optical neural processing and supervised learning," Abstracts of the 1st Int. Neural Network Society Meeting, Vol. 1, P. 391 (Sept. 1988). IP thresholding will avert convergence to complement vectors in this case.

Third, when a partial stored vector is introduced as an input vector, it could actually be close to a different stored vector. For example, input vector a3(1:4) in the seventh row is closer to the stored vector a2 in terms of Hamming distance. With bipolar binary representation, this input vector converges to a2, which is correct but only with IP thresholding, which illustrates the advantage of IP thresholding in the case of bipolar binary representation. With unipolar binary representation, the input correctly converges to a3 with or without IP thresholding, which illustrates the superiority of using unipolr representation of the input vector with bipolar representation of the stored vectors.

Trinary Neuron Representation and Measure of Similarity

From the observations of the simulation results in the preceding section, it is evident that each of the two (unipolar and bipolar) input representations has its own merit. With bipolar binary input and IP thresholding, the convergence outcome of the associative memory always agrees with the minimum Hamming distance criterion. At the same time, the bipolar binary representation prevents the input from converging to a false (complement) vector. On the other hand, the use of binary unipolar representation seems to recognize a partial input irrespective of its Hamming distance. By examining the convergence mechanism and the inner product, the following is noted:

(1) When the partial input vector is represented in unipolar binary, the largest inner product is usually contributed by those partial input vector elements known (i.e., nonzero elements) that are in common with corresponding elements of a stored vector.

(2) The inner product corresponding to the unipolar binary input comes only from the matching 1's of the known elements.

(3) When partial inputs are represented in bipolar binary, the largest inner product is contributed both by the known as well as the unknown elements of the input vector since both the unknown elements and known 0's are being represented by $-1$. Consequently, known 0's contribute toward increasing the inner products while the unknown elements contribute toward increasing/decreasing the inner products when the number of matching 0's is greater/less than the number of mismatched 1's.

(4) The advantage of having 0's in the unknown portion of the partial inputs (represented in unipolar binary) is that the 0's do not contribute toward either increasing or decreasing the inner product.

To combine the merits of both unipolar and bipolar neuron representations, the present invention proposes the use of trinary neuron representation for the input vector, while the associative memory uses bipolar binary representation for stored vectors. To make the inner product more significant, the new neuron representation makes use of matching 0's, but to do that, only the elements of a partial input vector that are known (which will then be common with those of a stored vector) should be represented in bipolar binary, and the remaining elements should be set to zero. The initial inner product corresponding to the partial input vector will then be equal to the number of known elements. Thereafter, one can apply IP thresholding to accelerate convergence and to avoid convergence to a negative inner product, i.e., to a complement of the stored vector. This mode of representation for the input vector, in which the known elements are in bipolar binary and the remaining elements are 0's, is defined as trinary representation.

The advantage of using trinary representation for an input vector may be readily appreciated from another point of view. To measure closeness, Hamming distance should be used only for the partial elements, and not for the whole vector, since it is understood that one does not know the remaining elements of the stored vector for a partial input vector. Consequently, there is no use comparing the rest of the stored vector with the unknown elements of the input vector. Thus, in the first iteration, the unknown elements of the input vector are kept inert by setting them to zero. Then, only after the first iteration, the feedback vector is represented in bipolar binary for accelerating the convergence process.

One-Dimensional Image Recognition with Trinary Representation

All of the problematic cases of the table in FIG. 2a are now repeated with the proposed trinary representation of the input vector and bipolar representation of stored vectors. These problem cases of the input vectors are, respectively, a3(1:4), a4(1:4), a1(16:20), a1(13:20) a1(1 2,18:20) and a4(1,2,18:20). For simplicity, the detailed calculations for only one of the above cases, a3(1:4), are presented here.

In the earlier representation, the input vector would have been represented as (1 1 0 0 0 0 0 0 0 0 0 0 0 0 0 0 0 0 0 0) in unipolar and as (1 1 $-1$ $-1$ $-1$ $-1$ $-1$ $-1$ $-1$ $-1$ $-1$ $-1$ $-1$ $-1$ $-1$ $-1$ $-1$ $-1$ $-1$ $-1$ ) in bipolar binary, whereas in trinary representation, it is given by (1 1 $-1$ $-1$ 0 0 0 0 0 0 0 0 0 0 0 0 0 0 0 0), where the nonzero numbers in bipolar binary are known, and the trailing zeroes represent unknown elements of the input vector.

Inner products after the first trial = ($-2$ 0 4 $-2$).

Inner products with IP thresholding = (0 0 4 0).

Inner products after third iteration = ($-4$ $-6$ 20 $-2$).

Inner products after IP thresholding = (0 0 20 0).

Thresholding the inner products thus eliminates all but the maximum inner product. The inner products on the third trial exceeds the sum of absolute inner products of the remaining vectors, thus indicating that on the third trial the input has finally converged to a3. While only the case of a3(1:4) was worked out here, a table set forth in FIG. 3 lists the results of that and the other five cases.

The trinary neuron representation works best with partial inputs, provided the positions of the partial input elements are known. However, from FIG. 2b it is seen that when the input is totally random and it is not known which part of the input contains the correct information, bipolar binary representation for the inputs along with IP thresholding is preferable for achieving convergence to the expected stored vector having minimum Hamming distance, thus demonstrating the power of IP thresholding.

Two-Dimensional Image Recognition with Trinary Representation

Most visual information is two-dimensional. Accordingly, the performance of an associative memory with bipolar stored vectors and a trinary representation of input vectors will now be discussed in retrieving two-dimensional stored images. Consider that the associative memory can store an array of m×n two-dimensional images, each in the form of a bipolar mn-element vector.

Figure 5:
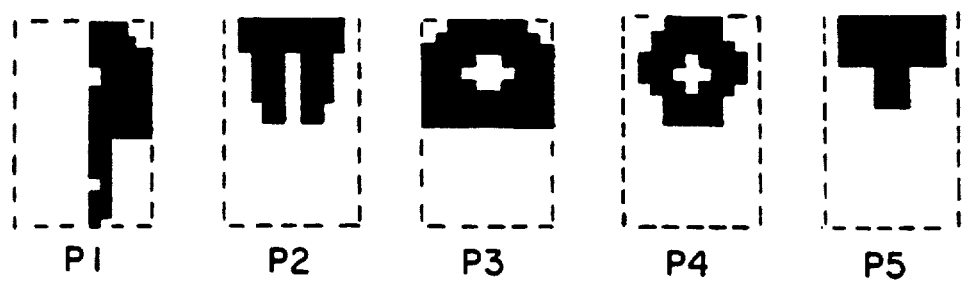
FIG. 5 illustrates nine partial inputs used in evaluation of the present invention.
Figure 5:
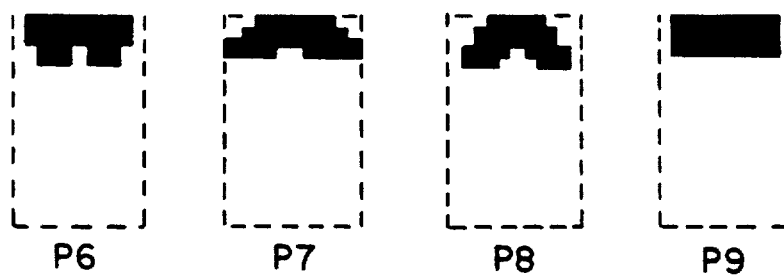

FIG. 4 shows two-dimensional stored images of four machine objects, S1, S2, S3 and S4, each having 11×20 pixels. The set of Hamming distances for those stored images are (0,67,56,55), (67,0,77,94), (56,77,0,67) and (55,94,67,0), respectively. Therefore, the four stored images are reasonably similar as far as their relative Hamming distances are concerned. FIG. 5 shows nine partial inputs P1 through P9 used in evaluation of the trinary representation. Note that P2 and P6 are the partial inputs of the stored image (two-dimensional vector) S1; P1, P3, and P7 are the partial inputs of stored image (two-dimensional vector) S2; P4 and P8 are the partial inputs of stored image (two-dimensional vector) S3; and P5 and P9 are the partial inputs of stored image (two-dimensional vector) S4.

Figure 6:
FIG. 6 illustrates nine converged two-dimensional images corresponding to the nine partial inputs of FIG. 5 for the stored images of FIG. 4 without inner-product thresholding when partial inputs are represented by unipolar binary values.
Figure 6:
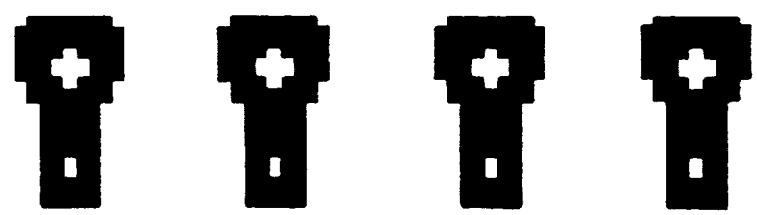
Figure 7:
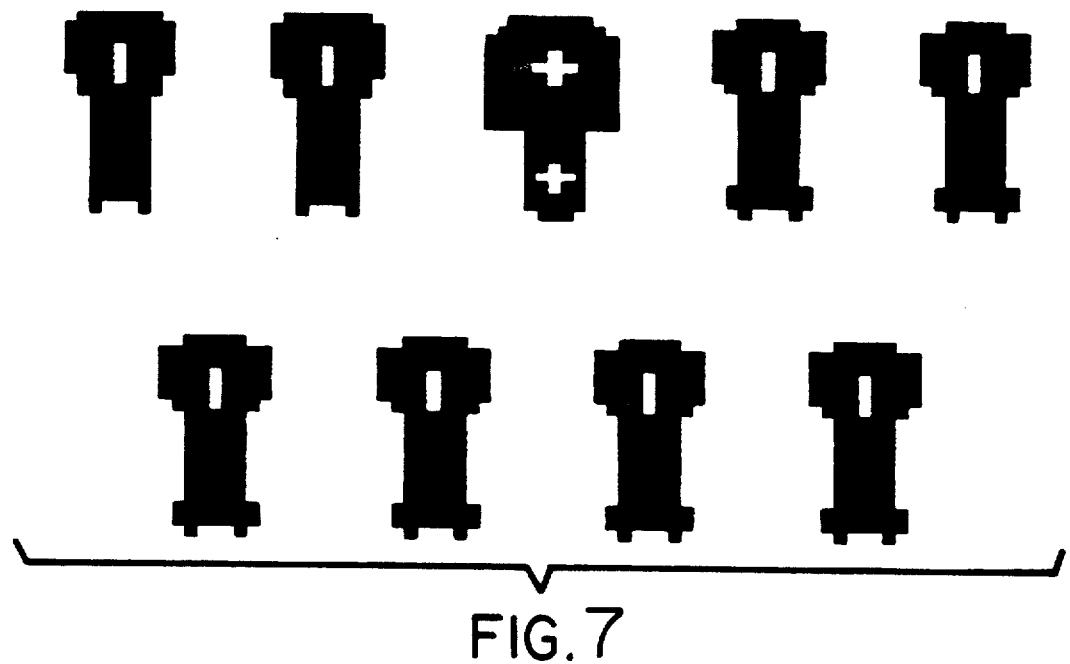
FIG. 7 illustrates nine converged two-dimensional images corresponding to the partial input images of FIG. 5 without inner-product thresholding when partial inputs are represented by bipolar binary values.
Figure 8:
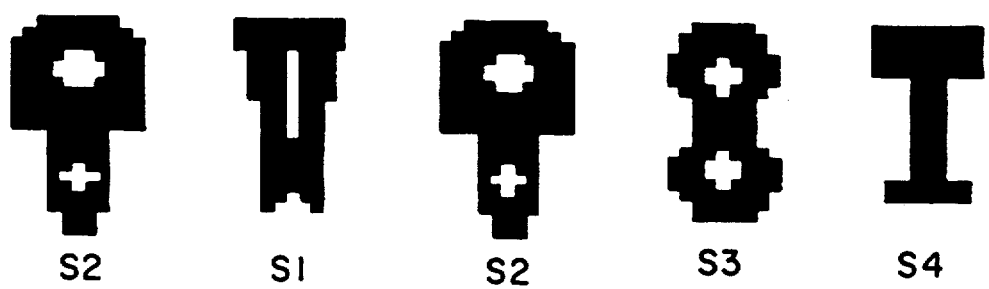
FIG. 8 illustrates nine converged two-dimensional images with inner-product thresholding corresponding to the partial input images of FIG. 5 when they are represented in trinary form.
Figure 8:
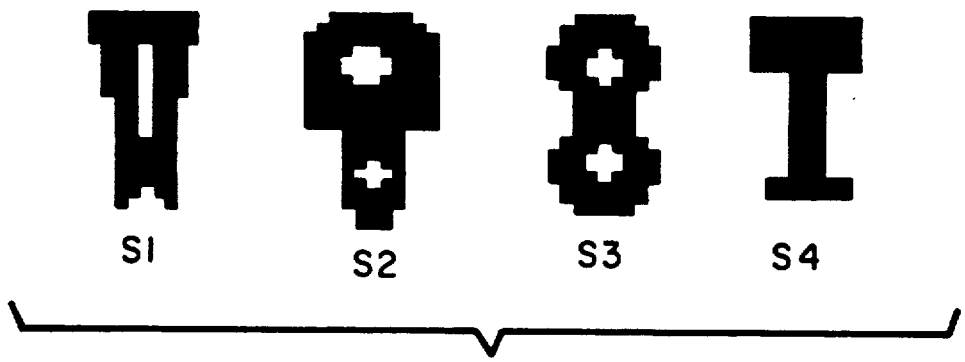

To compare the performances of different neuron representations, the partial inputs are encoded using unipolar binary, bipolar binary and trinary representation. FIG. 6 shows nine retrieved images corresponding to the nine partial inputs when they are represented using unipolar binary representation. Similarly, FIGS. 7 and 8 show the retrieved images corresponding to the partial inputs when they are represented using bipolar $(1, -1)$ and trinary $(1, 0, -1)$ representation, respectively. Note that IP thresholding has been used in the trinary case. The inner product is left unchanged when it is greater than or equal to the average of inner products; otherwise it is set equal to zero.

It can be seen that each of the trinary partial inputs readily converges to a stored two-dimensional vector to which it corresponds. From amongst the unipolar binary partial inputs only P1 and P3 converge to the stored two-dimensional vector S2, while the remaining partial inputs result in false convergences (indicated by FC). These FC images are different from the stored images, but they are formed from linear combinations of the stored images. Surprisingly, from amongst the bipolar binary partial inputs, none of the partial inputs leads to a correct convergence. Note, however, that the bipolar partial input vector P3 almost converges to stored vector S2. Further, there are two interesting cases that deserve special attention. The bipolar binary partial input vectors P5 and P9, both of which correspond to stored vector S4, do indeed converge to stored vector S4 after the first iteration, but with subsequent iterations they converge to false vectors.

The foregoing shows the effects of IP thresholding and of various input neuron representations, and show that an optimum neuron representation for effective associative recall is the trinary neuron representation, in which the known portion of the partial input is represented in bipolar binary and the unknown portion is represented by 0's. Trinary representation eliminates most of the discrepancies found in conventional neuron representations.

The trinary neuron representation has been used to successfully retrieve from storage one-dimensional vectors as well as two-dimensional vectors of obscured machine objects using partial input vectors. Performance of trinary neuron representation makes the otherwise conventional bipolar associative memory a viable processor for error-free character recognition. All that is required is to use trinary representation for the partial input vector and to then feed back the initial inner product in bipolar representation corresponding to the partial input vector (ignoring the 0's representing unknown elements). Thus, after the first trial, the inner product in bipolar representation is fed back as the partial input vector for each subsequent iteration until convergence is reached. Inner-product (IP) thresholding is employed to accelerate convergence and to avoid convergence to a negative inner product. The use of IP thresholding has been found to be advantageous even with other forms of representation for stored and input vectors.

Figure 9:
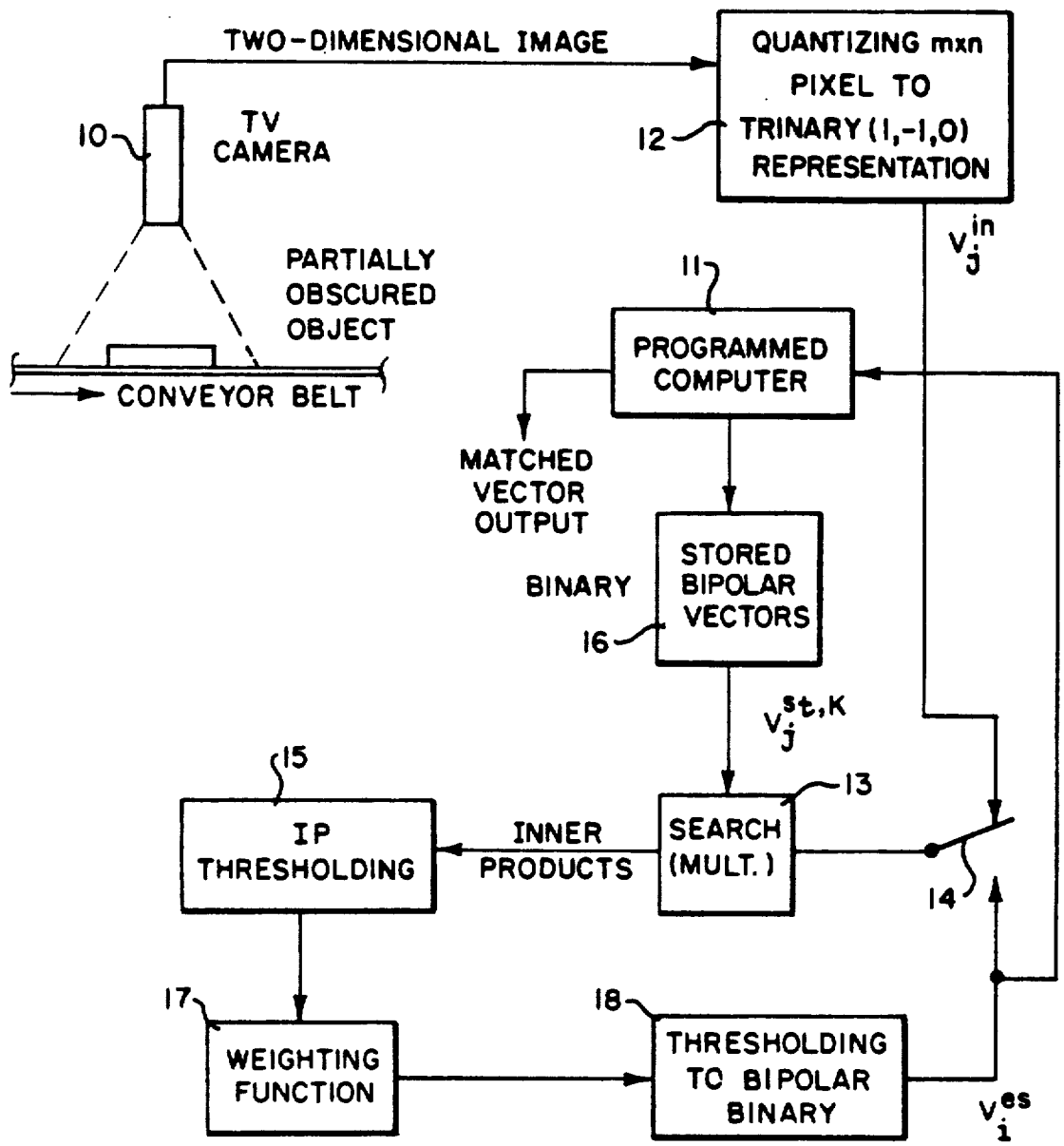
FIG. 9 is a block diagram of a two-dimensional, inner-product, trinary associative image system in accordance with the invention using bipolar representation for vector storage and trinary representation for partial input vectors, with thresholding of the inner products used for estimating a vector fed back as the input vector after each iteration until convergence is reached.

A functional block diagram for a system is illustrated in FIG. 9 using a television camera 10 as a two-dimensional vector input source, and although the system may be readily implemented with electronic hardware under control of a programmed computer 11, it is preferably implemented with optical processing components for faster real time optical associative retrieval. An optical trinary associative memory is relatively convenient to implement using a polarization-encoded optical shadow-casting (POSC) system. M. A. Karim, A. A. S. Awwal, and A. K. Cherri, "Polarization-encoded optical Shadowcasting logic units: design," Appl. Opt. 26 (14), 2720–2725 (1987) and A. A. S. Awwal and M. A. Karim, "Associative polarization-encoded optical shadow casting: gray-level image encoding for serial and parallel operations," Appl. Opt. 28(2), 284–290 (1989). Alternatively, a polarization-encoded hologram may be used. The POSC system has already been designed to accommodate mixed mode numbers for optical computing applications. A. A. S. Awwal, M. A. Karim and A. K. Cherri, "Polarization-encoded optical shadow-casting scheme: design of multioutput trinary combinational logic units," Appl. Opt. 26(22) 4814–4818 (1987). The input vector can be represented by an array of light emitting diode (LED) source patterns, while the stored vectors can be coded on transparencies or in a liquid crystal spatial light modulator. H. K. Liu, J. A. Davis and R. A. Lilly, "Optical-data-processing properties of a liquid-crystal television spatial light modulator," Opt. Lett. 10, 635–637 (1985) and H. K. Liu, S. Y. Kung and J. A. Davis, "Real-time optical associative retrieval technique," Opt. Eng. 25(7), 853–856 (1986).

Referring to FIG. 9, the first function represented by block 12 is to quantize mxn pixels (elements) of a two-dimensional vector into bipolar binary values $(1, -1)$ for known elements and to set all unknown elements to 0. This function may be carried out by special purpose hardware or with just a frame store and an algorithm stored in the computer 11, i.e., by computer software. Once the initial input vector in trinary format has been fed into a search operation block 13, which performs the first (inner) multiplication of Equation (3), a switch 14 is operated by the control computer 11 to connect the first search operation block 13 to accept each estimated vector $V_f^{es}$ for the next and subsequent iterations until convergence is reached, after which the switch 14 is returned to a position to accept a new input vector.

The inner products of the first multiplication operation in block 13 are processed through an IP thresholding block 15 (either zero-crossing or average of inner products). The IP thresholding function and the first multiplication function of the search operation may also be readily carried out by software stored in the computer 11, particularly if the stored bipolar vectors 16 are initially stored in computer memory, such as by processing images of known, unobscured objects through the quantizing block 12 also implemented with computer software. Note that if an unobscured object is scanned by the television camera to store a vector, quantizing the pixels to 1 and $-1$ values results in bipolar binary representation, there being no unknown pixels to be set to 0.

A weighting function (second multiplication) is carried out in block 17. That multiplication function, shown within brackets in Equation (3), may also be readily carried out in the computer 11 by software. Then the products of this second multiplication (the outer products of Equation (3)) are thresholded in block 18 to carry out the function of the outer "sgn" in Equation (3) and to format the next input vector $V_i^{es}$ presented through switch 14 in bipolar binary. Thus, after thresholding each of the inner products of each iteration in block 15, blocks 17 and 18 form an estimated vector which is a linear combination of the bipolar binary stored vector weighted by the thresholded inner products. Each estimated vector is fed back as the input vector for the next iteration until convergence is reached. Note that the estimated vectors are also fed to the control computer 11 which is programmed to determine when convergence has been reached.

The functional block diagram of FIG. 9 could, of course, be implemented with special purpose hardware, particularly optical hardware, for greater speed where real-time recognition of input vectors requires such greater speed than, for example, recognition of machine parts on a conveyor belt. But the simulation results presented above have been successfully carried out with computer software at speeds that would likely be comparable to conveyor belt speeds. Consequently, it is intended that the claims be interpreted to cover implementation with electronic hardware and optical hardware as well as software.

What is claimed is:

1. In an inner-product array processor system for associative retrieval of a stored image from among a plurality of different images stored in a digital memory using a partial image input, each pixel elements of said stored images being represented by bipolar binary values of $+1$ and $-1$, where a $+1$ is represented by a fixed positive value of voltage and a $-1$ is represented by a fixed negative value of voltage, a method comprised of
    representing each known pixel element of said partial image by said bipolar binary values of $+1$ and $-1$, and setting the value of each unknown pixel element of said partial image to 0, where a 0 is represented in said system by a zero voltage,
    forming an inner product for each trial comparison with stored images in an iterative search process for the closest estimated image with the initial inner products corresponding to the known pixel elements of the partial image input,
    forming an estimated image which is a linear combination of the bipolar binary stored image weighted by said inner products,
    feeding back each of said estimated images represented in bipolar binary values of $+1$ and $-1$ as the input image for the next iteration, thereby using the maximum inner products of each successive iteration as weights which generate an input image for the next iteration, and
    repeating the process until convergence is reached, thereby retrieving a stored image from said memory which corresponds to a best match of a stored image with said partial image input.

2. A method as defined in claim 1 including the step of thresholding each of said inner products formed.

3. A method as defined in claim 2 wherein said step of inner product thresholding is comprised of average-inner-product thresholding.

4. A method as defined in claim 2 wherein said step of inner-product thresholding is comprised of zero-crossing thresholding.

5. In an inner-product array processor system for associative retrieval of a stored image represented by bipolar pixel elements from among a plurality of different stored images, wherein pixel elements of each image are stored in a digital memory using bipolar voltage values of $+1$ and $-1$, an iterative method of finding a best match of a stored image with a partial input image having known pixel elements represented by bipolar values of $+1$ and $-1$, and unknown pixels represented by zero voltage value by finding the maximum inner product of said partial input image and each of said stored images to be fed back as an input image for each iteration after the first, said iterative method comprising thresholding of the inner products for finding a maximum inner product from among all inner products during each trial search, and using said maximum inner product as a partial input image for a subsequent iteration until convergence is reached thereby retrieving a stored image from said memory which corresponds to a best match of said partial input image with a stored image.

6. In an inner-product array processor system for associative retrieval of a stored image, a method as defined in claim 5 wherein said inner-product thresholding is accomplished by average inner-product thresholding.

7. In an inner-product array processor system for associative retrieval of a stored image, a method as defined in claim 5 wherein said inner-product thresholding is accomplished by zero-crossing thresholding.

8. In an inner-product array processor for associative retrieval of a stored image from among a plurality of different images stored in memory, a system comprising
    means for storing a plurality of images as pixel elements represented by bipolar binary values of $+1$ and $-1$, where a $+1$ is represented by a fixed positive value of voltage and a 31 1 is represented by a fixed negative value of voltage,
    means for representing a partial binary input image to be compared with said stored images in search of a best match with a stored image, said representation being by bipolar binary values of $+1$ and $-1$ partial input image, where 0 is represented in said system by a zero voltage,
    means for forming an inner product for each trial comparison with stored images in an iterative search process for the closest estimated image until convergence is reached,
    means for estimating an image which is a linear combination of a bipolar stored image for each iteration of said search process and weighted by said inner products, and
    means for feeding back said estimated image after each iterative trial as an input image represented in bipolar binary values $+1$ and $-1$.

9. In an inner-product array processor, a system as defined in claim 8 including means for inner product thresholding to find the maximum inner product to be used to generate an estimated image fed back as the net input image after each iterative trial.

10. In an inner-product array processor, a system as defined in claim 9 wherein said inner product thresholding is accomplished by average-inner-product thresholding.

11. In an inner-product array processor, a system as defined in claim 9 wherein said inner product thresholding is comprised of a zero-crossing thresholding.

* * * * *

UNITED STATES PATENT AND TRADEMARK OFFICE
CERTIFICATE OF CORRECTION

PATENT NO. : 5,257,389
DATED : October 26, 1993
INVENTOR(S) : Hua-Kuang Liu, Abdul A.S. Awwal and Mohammad A. Karim It is certified that error appears in the above-indentified patent and that said Letters Patent is hereby corrected as shown below:

On the title page, Item [54]:
At the beginning of the title before "-PRODUCT" delete "IMER" and substitute AN INNER At the end of the title after "REPRESENTED BY" delete (+1,-1) and substitute (+1,0,-1)

Signed and Sealed this

Thirty-first Day of May, 1994

Attest:

BRUCE LEHMAN

Attesting Officer      Commissioner of Patents and Trademarks